United States Patent
Kulkarni et al.

(10) Patent No.: US 10,405,701 B2
(45) Date of Patent: Sep. 10, 2019

(54) APPARATUS FOR MAKING MIXED BEVERAGES

(71) Applicant: Koolatron Corporation, Brantford (CA)

(72) Inventors: Arun Kulkarni, Brantford (CA); Leonardo Aldana, Waterloo (CA)

(73) Assignee: KOOLATRON CORPORATION, Brantford (CA)

( * ) Notice: Subject to any disclaimer, the term of this patent is extended or adjusted under 35 U.S.C. 154(b) by 736 days.

(21) Appl. No.: 15/130,093

(22) Filed: Apr. 15, 2016

(65) Prior Publication Data

US 2016/0302618 A1    Oct. 20, 2016

Related U.S. Application Data

(60) Provisional application No. 62/148,816, filed on Apr. 17, 2015.

(51) Int. Cl.
*A47J 43/042* (2006.01)
*A47J 43/07* (2006.01)

(52) U.S. Cl.
CPC ............. *A47J 43/042* (2013.01); *A47J 43/07* (2013.01)

(58) Field of Classification Search
CPC .......... F25C 5/12; F25C 5/02; B02C 18/2291; B02C 18/2216; B02C 18/22; B02C 18/2225; A47J 43/042; A47J 43/07
USPC .................................................. 241/DIG. 17
See application file for complete search history.

(56) References Cited

U.S. PATENT DOCUMENTS

| | | | | |
|---|---|---|---|---|
| 3,837,587 A | * | 9/1974 | Walter | A47J 43/042 241/100 |
| 4,276,750 A | * | 7/1981 | Kawasumi | B67D 1/00 62/137 |
| 4,745,773 A | | 5/1988 | Ando | |
| 4,786,002 A | * | 11/1988 | Mitsubayashi | A23G 9/045 241/101.8 |

(Continued)

FOREIGN PATENT DOCUMENTS

WO    2012/177999 A2    12/2012

OTHER PUBLICATIONS

Margaritaville Key West Frozen Concoction Maker with Accessories <http://www.margaritavillecargo.ca/en_CA/party-machines/margaritaville-key-west-frozen-concoction-maker-with-accessories/DM1055-DTC.html#start=1>, accessed Apr. 15, 2015.

(Continued)

*Primary Examiner* — Matthew Katcoff
(74) *Attorney, Agent, or Firm* — Bereskin & Parr LLP/S.E.N.C.R.L., s.r.l.

(57) ABSTRACT

An apparatus for making mixed beverages may include a housing, a first hopper for receiving a first beverage ingredient, and a shaving mechanism. The shaving mechanism may include a first body that receives the first beverage ingredient from the first hopper. The first body may include a sidewall, at least one shaving blade and at least one respective opening extending through the sidewall. In use, the shaving blade shaves the first beverage ingredient, the first beverage ingredient is delivered through the opening in the sidewall, and the first beverage ingredient is conveyed within the first body. The apparatus may further include a mixing mechanism including a second body for receiving the first beverage ingredient from the first body.

20 Claims, 9 Drawing Sheets

(56) References Cited

U.S. PATENT DOCUMENTS

| | | | | | |
|---|---|---|---|---|---|
| 5,960,701 | A | * | 10/1999 | Reese | B67D 1/0039 222/135 |
| 6,527,212 | B2 | * | 3/2003 | Rupp | A23G 9/045 241/293 |
| 6,959,562 | B2 | | 11/2005 | Navedo et al. | |
| 7,395,751 | B2 | | 7/2008 | Liu | |
| 2013/0126650 | A1 | | 5/2013 | Hotaling et al. | |

OTHER PUBLICATIONS

Electric Snow Cone Maker Ice Shaver Machine <http://www.trendtimes.com/electric-snow-cone-maker-ice-shaver-machine-440lb-hr.html>, accessed Apr. 15, 2015.

Snow Cone Ice Shaver Crusher with Cast-iron Base <http://www.trendtimes.com/snow-cone-ice-shaver-crusher-with-cast-iron-base.html>, accessed Apr. 15, 2015.

Nostalgia Electrics Ice Shaver <http://www.bedbathandbeyond.ca/store/product/nostalgia-electrics-ice-shaver/1044116972>, accessed Apr. 15, 2015.

Nostalgia Electrics RISM900COKE Coca-Cola Electric Shaved Ice Machine <http://nostalgiaelectrics.com/product/rism900coke-coca-cola-electric-shaved-ice-machine/>, accessed Apr. 15, 2015.

Hamilton Beach Snowman Ice Shaver <http://intl.target.com/p/hamilton-beach-snowman-ice-shaver-68010/-/A-515229>, accessed Apr. 15, 2015.

Hamilton Beach Icy Treats Maker <http://www.target.com/p/hamilton-beach-icy-treats-maker-68050/-/A-10420469>, accessed Apr. 15, 2015.

Hatsuyuki Ice Cube Shaver HC-18C <http://www.hatsuyuki.jp/hc18c_page.htm>, accessed Apr. 15, 2015.

Smart Battery 12V 25AH Deep Cycle Lithium Ion Battery <http://www.lithiumion-batteries.com/products/12v-25ah-lithium-ion-battery>, accessed Apr. 15, 2015.

* cited by examiner

APPARATUS FOR MAKING MIXED BEVERAGES

CROSS-REFERENCE TO RELATED APPLICATION

This application claims priority to U.S. Provisional Application No. 62/148,816 filed on Apr. 17, 2015, the entire contents of which are hereby incorporated herein by reference.

FIELD

The present disclosure relates generally to small, household electrical appliances that are used for making mixed beverages.

INTRODUCTION

The following is intended to introduce the reader to the detailed description that follows and not to define or limit the claimed subject matter.

In an aspect of the present disclosure, an apparatus for making mixed beverages is described. The apparatus may include: a housing; an electric motor in the housing; a first hopper in the housing for receiving a first beverage ingredient; and a shaving mechanism supported in the housing, the shaving mechanism including a first body arranged to receive the first beverage ingredient from the first hopper, the first body including a sidewall, at least one shaving blade located on the sidewall, and at least one respective opening extending through the sidewall. The first body may be configured to receive torque from the electric motor to move the at least one shaving blade so that i) the at least one shaving blade shaves the first beverage ingredient, ii) the first beverage ingredient is delivered through the at least one opening in the sidewall, and iii) the first beverage ingredient is conveyed within the first body.

The first body may be configured to receive the torque from the electric motor to rotate the at least one shaving blade about an axis. The first beverage ingredient may be delivered through the at least one opening generally in a first radial direction that is orthogonal to the axis. The first beverage ingredient may be delivered from the first hopper to the first body by force of gravity. The first beverage ingredient may be conveyed within the first body generally in a first axial direction that is parallel to the axis. The first axial direction may be generally horizontal. A diameter dimension between the sidewall and the axis may increase along the first axial direction. The sidewall may be generally frustoconical in shape.

The first body may include a plurality of shaving blades spaced apart about the sidewall, and a plurality of respective openings extending through the sidewall.

The apparatus may further include a mixing mechanism supported in the housing, the mixing mechanism including a second body for receiving the first beverage ingredient from the first body. The second body may be connected to and may be driven by the first body to rotate about an axis. The second body may include at least one mixing blade for urging the first beverage ingredient generally in a first axial direction that is parallel to the axis. The second body may include at least one mixing blade for urging the first beverage ingredient generally in a second axial direction parallel to the axis.

The apparatus may further include a second hopper for receiving a second beverage ingredient, and the second beverage ingredient may be delivered from the second hopper to the first body by force of gravity. The at least one shaving blade of the first body may shave the second beverage ingredient supplied by the second hopper, the second beverage ingredient may be delivered through the at least one opening in the sidewall, and the second beverage ingredient may be conveyed within the first body. The at least one shaving blade may include a first blade portion for shaving the first beverage ingredient and a second blade portion for shaving the second beverage ingredient. The first body may receive torque from the electric motor to rotate the at least one shaving blade about an axis, and the first blade portion may be closer to the axis than the second blade portion. The first blade portion may include a flat blade edge and the second blade portion may include a serrated blade edge.

The apparatus may further include a third hopper for receiving a third beverage ingredient, and the third beverage ingredient may be delivered from the third hopper to the second body by force of gravity.

In an aspect of the present disclosure, an apparatus for mixing first and second beverage ingredients is described. The apparatus may include: a housing; an electric motor in the housing; a shaving mechanism including a first body rotatably supported by the housing and arranged to receive the first and second beverage ingredients, the first body including a sidewall, a plurality of shaving blades spaced apart about the sidewall, and a plurality of respective openings extending through the sidewall; and a mixing mechanism including a second body rotatably supported by the housing and arranged to receive the first and second beverage ingredients from the first body, the second body including a plurality of mixing blades. The first and second bodies may be configured to receive torque from the electric motor so that i) the shaving blades rotate about an axis and shave the first and second beverage ingredients, ii) the first and second beverage ingredients are delivered through the openings in the sidewall generally in a first radial direction that is orthogonal to the axis, iii) the first and second beverage ingredients are conveyed within the first body to the second body generally in a first axial direction that is parallel to the axis, and iv) the mixing blades mix the first and second beverage ingredients within the second body.

In an aspect of the present disclosure, an apparatus is described, which may include: a housing; a first hopper in the housing for receiving a first ingredient; a second hopper in the housing for receiving a second ingredient; a first body rotatably supported by the housing and arranged to receive the first ingredient from the first hopper and the second ingredient from the second hopper, the first body including a sidewall, at least one shaving blade located along the sidewall for shaving the first and second ingredients, and at least one opening extending through the sidewall for delivering the first and second ingredients into the first body; and a second body rotatably supported by the housing, the second body connected to and driven by the first body and arranged to receive the first and second beverage ingredients from the first body, the second body including at least one mixing blade for mixing the first and second ingredients within the second body.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Figure 1:
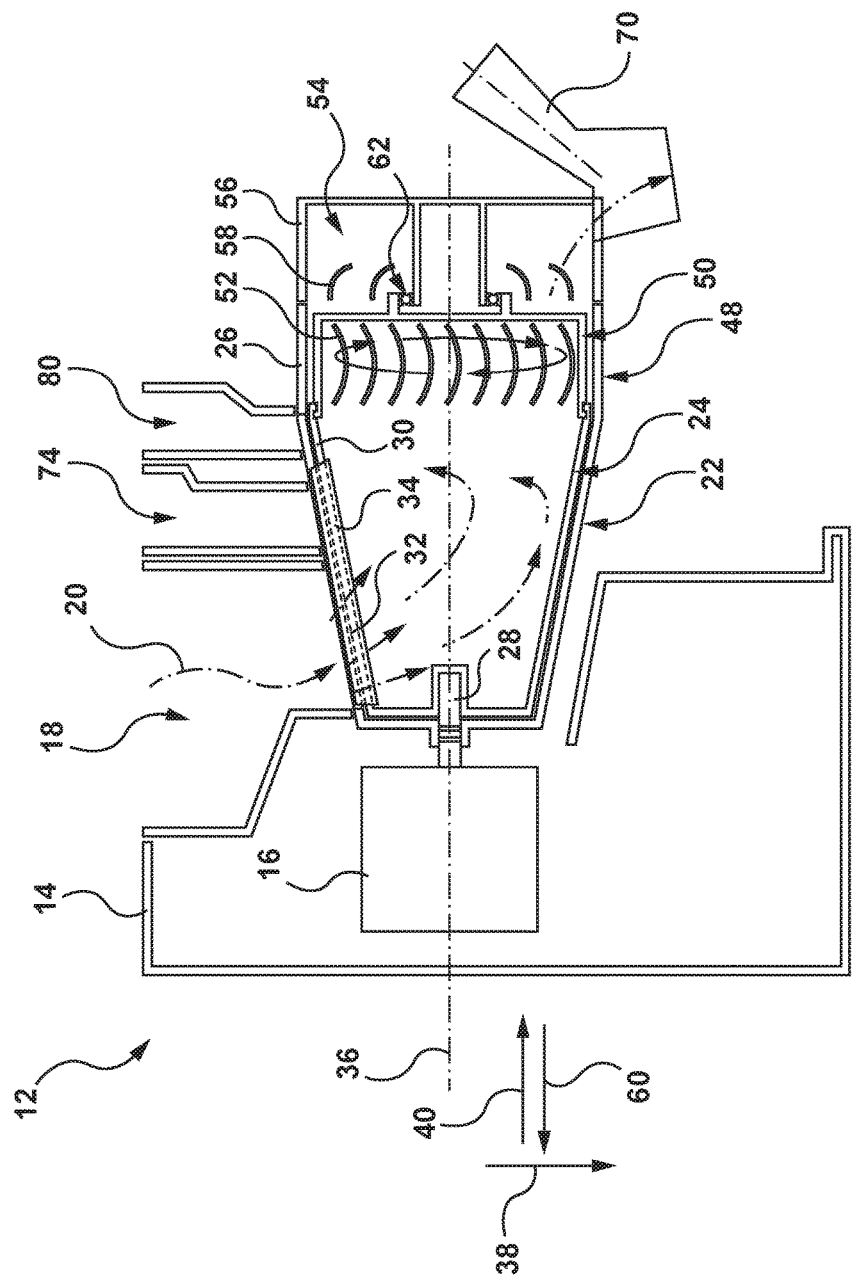
FIG. 1 is a schematic view of an example of an apparatus for making mixed beverages.
Figure 2:
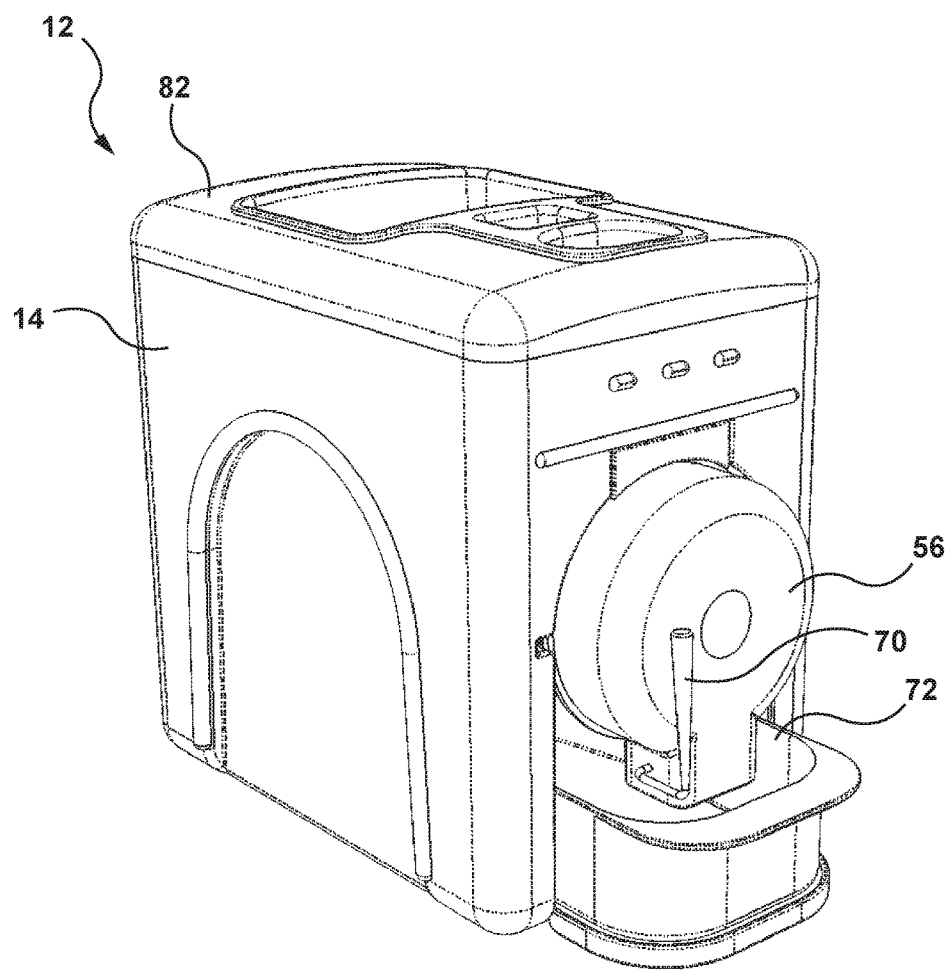
FIGS. 2, 3, 4 and 5 are perspective, front, side and top views, respectively, of the apparatus.
Figure 3:
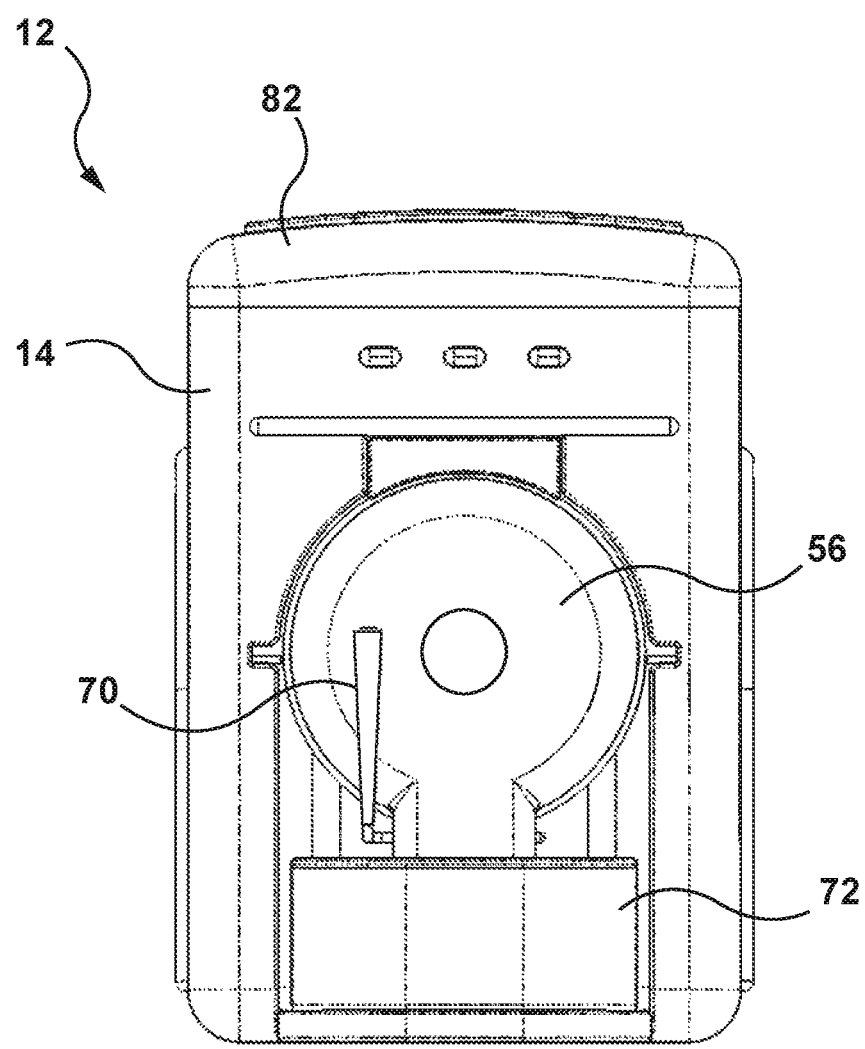
Figure 4:
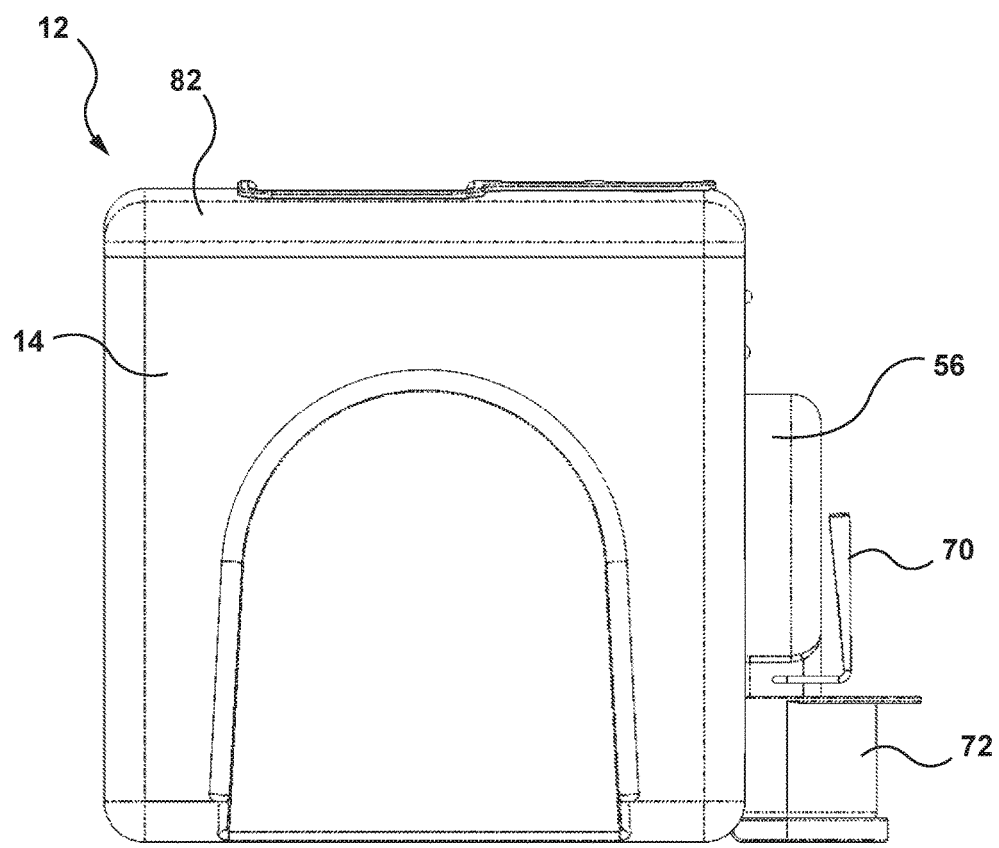

Referring to FIG. 1, a schematic representation of an apparatus for making mixed beverages is shown generally at reference numeral 12. The apparatus 12 is shown to include a housing 14, and an electric motor 16 in the housing 14. The housing 14 may define an exterior of the apparatus 12 (FIGS. 2, 3 and 4). The apparatus 12 may include one or more exterior buttons for controlling the electric motor 16 (e.g., separate speed levels, and reverse).

A first hopper 18 is shown in the housing 14 for receiving a first beverage ingredient 20. The first beverage ingredient 20 may be, for example, ice in the form of ice cubes.

A shaving mechanism 22 is shown supported in the housing 14. The shaving mechanism 22 may include a first body 24 that is arranged to receive the first beverage ingredient 20 from the first hopper 18. The first beverage ingredient 20 may be delivered from the first hopper 18 to the first body 24 by force of gravity.

In the example illustrated, the first body 24 is rotatably supported by a support 26, and is coupled to the electric motor 16 by an axle 28. The first body 24 is shown to include a sidewall 30, one or more shaving blades 32 located on the sidewall 30, and one or more respective openings 34 extending through the sidewall 30.

In the example illustrated, the first body 24 receives torque from the electric motor 16 to rotate the shaving blades 32 about an axis 36. The shaving blades 32 shave the first beverage ingredient 20. The first beverage ingredient 20 is then delivered through the openings 34 in the sidewall 30.

In the example illustrated, the first beverage ingredient 20 is delivered through the openings 34 generally in a first radial direction 38 that is orthogonal to the axis 36. The first beverage ingredient 20 is then conveyed within the first body 24. Thus, the first beverage ingredient 20 is conveyed generally in a first axial direction 40 that is parallel to the axis 36. The first axial direction 40 may be generally horizontal.

A diameter dimension between the sidewall 30 and the axis 36 may increase along the first axial direction 40. In the example illustrated, the sidewall 30 is generally frustoconical in shape. Thus, the first beverage ingredient 20 is urged generally in the first axial direction 40 by force of gravity and centrifugal force.

Figure 10:
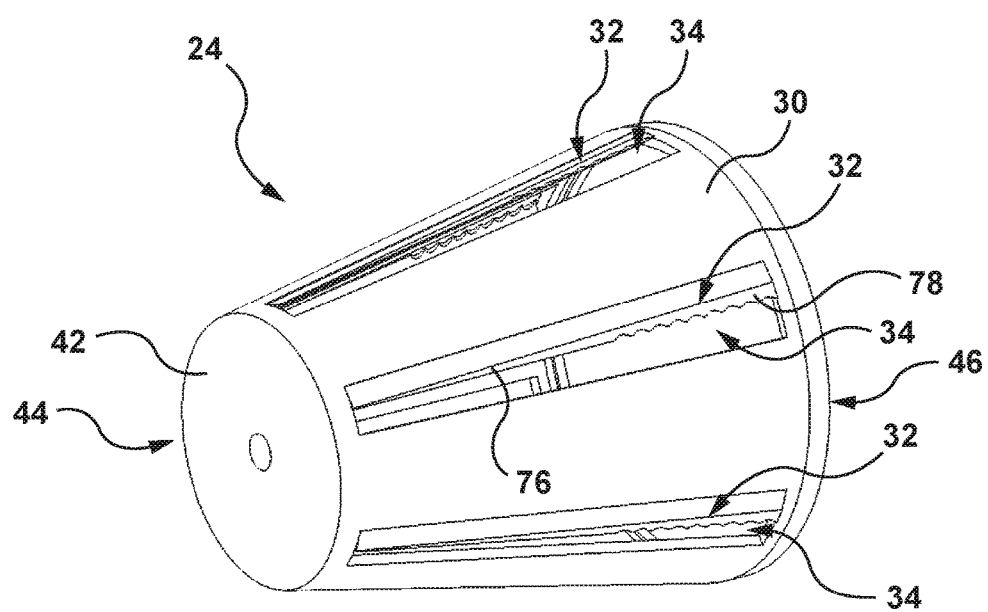
FIG. 10 is a side view of a component of the apparatus.

Referring to FIG. 10, the first body 24 may include a plurality of the shaving blades 32 spaced apart about the sidewall 30, and a plurality of the respective openings 34 extending through the sidewall 30. Because the shaving blades 32 are spaced apart about the sidewall 30, the shaving blades 32 shave the first beverage ingredient 20 in an intermittent manner, which may reduce load on the electric motor 16 (FIG. 1). In the example illustrated, in each pair the shaving blades 32 and the openings 34 are positioned adjacent to one another and extend axially from an end face 42 at a first end 44 towards a second end 46 of the first body 24.

Referring again to FIG. 1, a mixing mechanism 48 is shown supported in the housing 14. The mixing mechanism 48 may include a second body 50 for receiving the first beverage ingredient 20 from the first body 24. In the example illustrated, the second body 50 is connected to and is driven by the first body 24 to rotate about the axis 36. Thus, the electric motor 16 may provide torque to carry out both the shaving and mixing functions of the apparatus 12. Mating parts of the first body 24 and the second body 50 may be connected by snap fit, friction fit, screw threads, fasteners or other arrangement.

Figure 8:
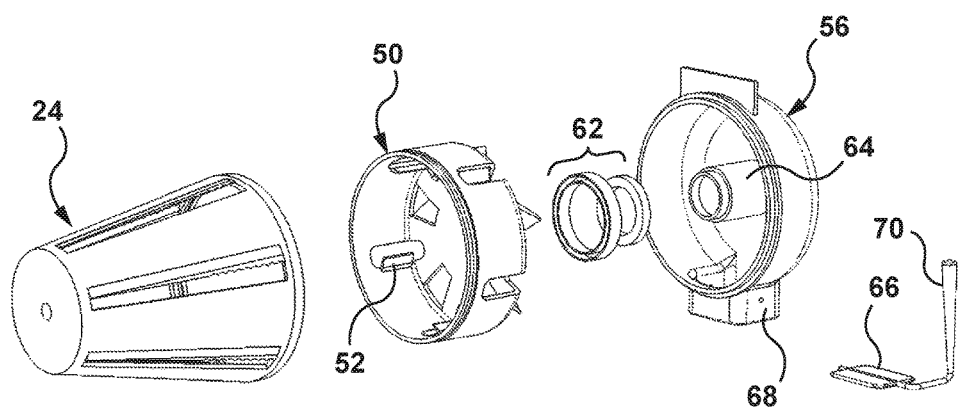
FIGS. 8 and 9 are exploded views of components of the apparatus.
Figure 9:
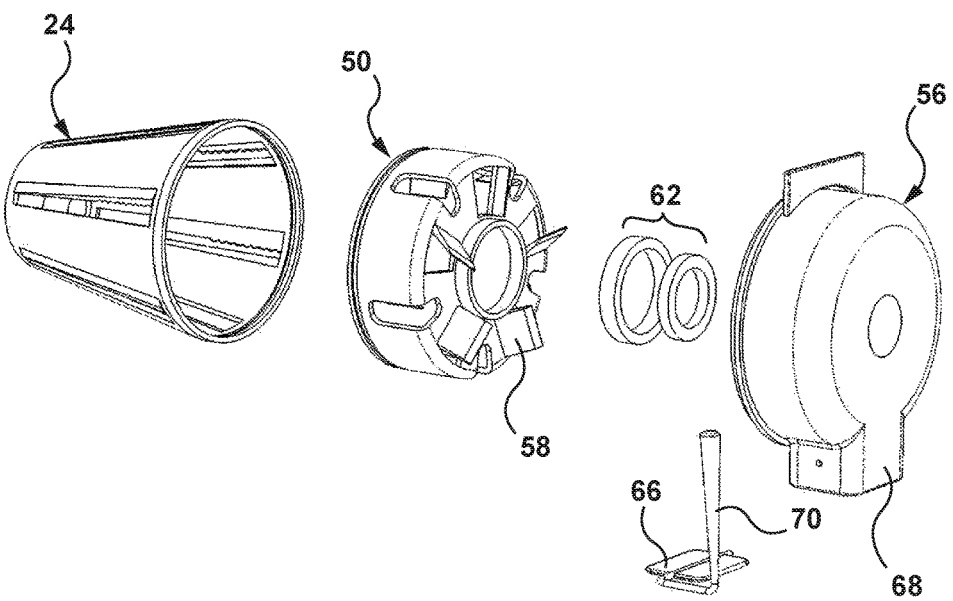

Referring to FIGS. 1, 8 and 9, the second body 50 may include one or more mixing blades 52 positioned next to corresponding sidewall openings. The mixing blades 52 are arranged to urge the first beverage ingredient 20 generally in the first axial direction 40 from the second body 50, through the sidewall openings of the second body 50 and into a space 54 defined by a cover 56. In the example illustrated, the second body 50 further includes one or more mixing blades 58 positioned next to corresponding endwall openings. The mixing blades 58 are arranged to urge the first beverage ingredient 20 generally in a second axial direction 60 from the space 54, through the endwall openings and into the second body 50. The combination of the mixing blades 52, 58 and counterflow in directions 40, 60 is intended to ensure thorough mixing.

In the example illustrated, a bearing assembly 62 couples the second body 50 and a central protrusion 64 of the cover 56. The bearing assembly 62 rotatably supports the second body 50 and prevents or at least reduces sagging and/or vibration during rotation of the first and second bodies 24, 50.

In the example illustrated, a dispensing nozzle is formed by a pivoting flap 66 arranged in an outlet portion 68 of the cover 56. The flap 66 is controlled by a handle 70 to dispense mixed beverage out of the space 54 and into a beverage tray 72 (FIGS. 2, 6, 8 and 9).

Referring again to FIG. 1, the apparatus 12 may further include a second hopper 74 for receiving a second beverage ingredient (not shown). The second beverage ingredient may be, for example, fruit, vegetables, or other solid or semi-solid food. The second beverage ingredient may be delivered from the second hopper 74 to the first body 24 by force of gravity.

In the example illustrated, the shaving blades 32 of the first body 24 also shave the second beverage ingredient supplied by the second hopper 74. The second beverage ingredient may then be delivered through the openings 34 conveyed within the first body 24 along with the first beverage ingredient 20.

Referring again to FIG. 10, the shaving blades 32 may include a first blade portion 76 for shaving the first beverage ingredient, and a second blade portion 78 for shaving the second beverage ingredient. The blade portions 76, 78 may have different characteristics. The blade portions 76, 78 may be insert-molded into the body 24, which may be formed of plastic. In the example illustrated, the first blade portion 76 has a flat blade edge, and the second blade portion 78 has a serrated blade edge. The serrated blade edge may be useful in shredding fruit delivered from the second hopper 74.

In the example illustrated, due to the shape of the sidewall 30, the first blade portion 76 is closer to the axis 36 (FIG. 1) than the second blade portion 78. This may provide greater torque for shaving the first beverage ingredient 20, and thereby reduce stress on the electric motor 16 and the axle 28 (FIG. 1).

Referring again to FIG. 1, the apparatus 12 may further include a third hopper 80 for receiving a third beverage ingredient (not shown). The third beverage ingredient may be, for example, water, juice, drink mixes and/or alcoholic beverages. In the example illustrated, the third hopper 80 delivers the third beverage ingredient through the sidewall openings of the second body 50 by force of gravity.

Figure 5:
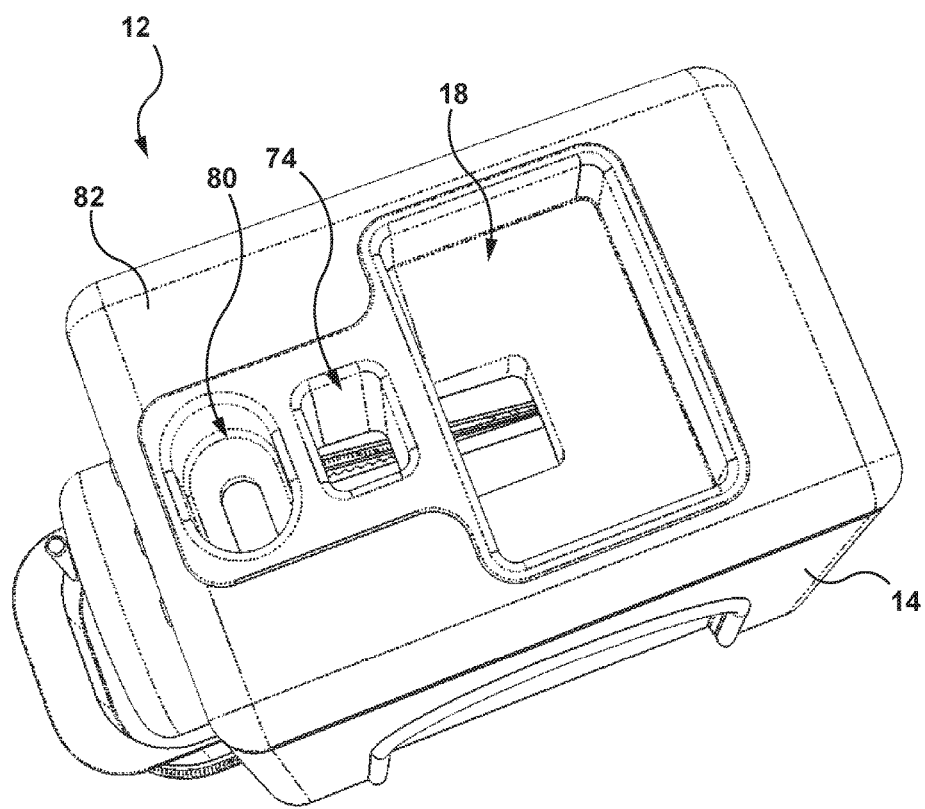
Figure 6:
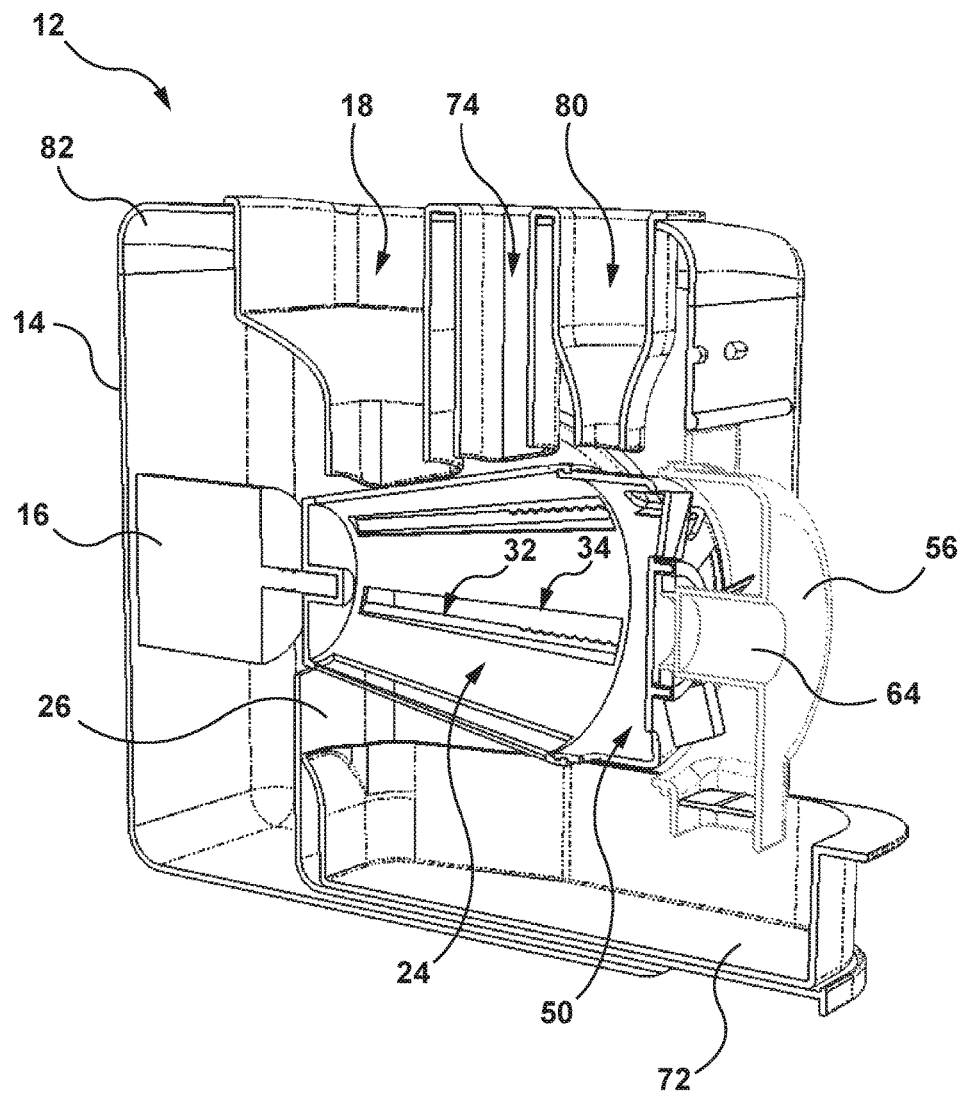
FIG. 6 is a sectional view of the apparatus.
Figure 7:
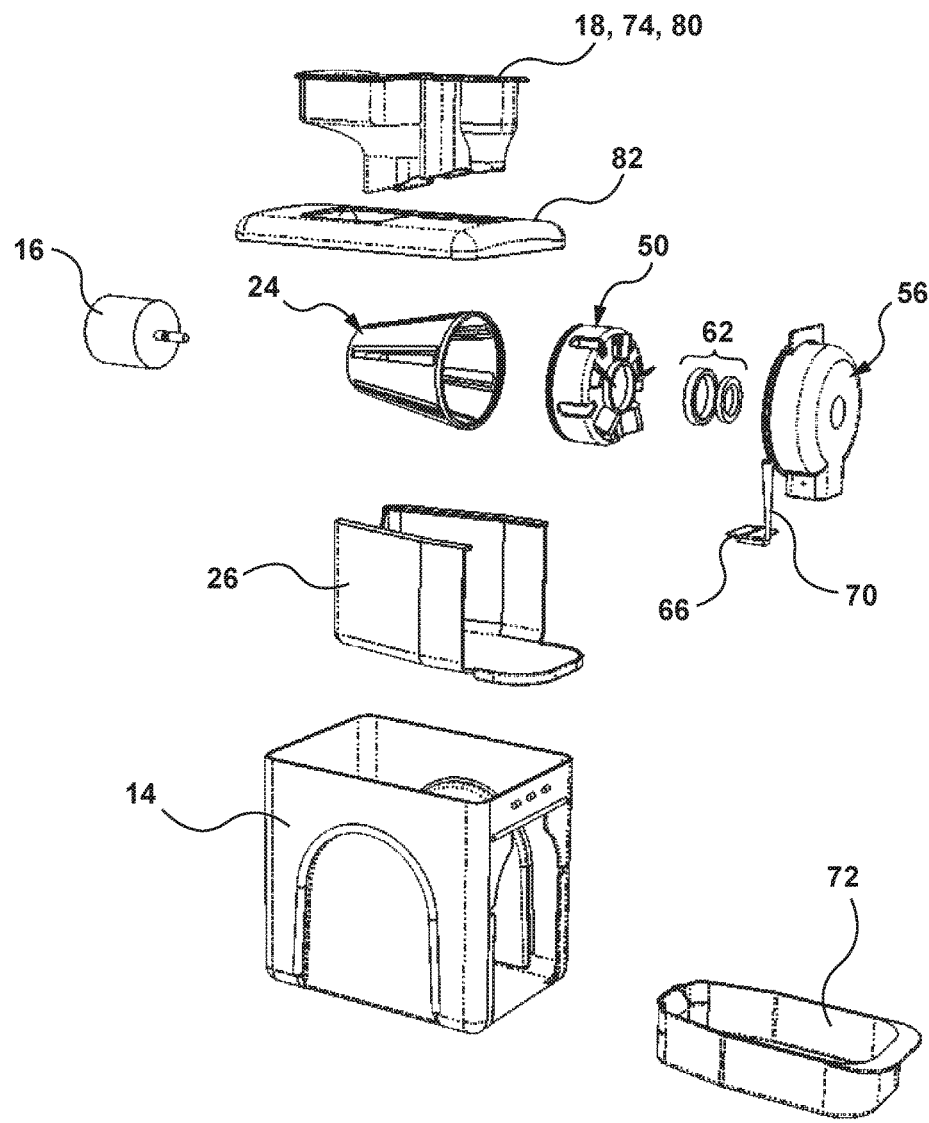
FIG. 7 is an exploded view of the apparatus.

Referring to FIGS. 5, 6 and 7, the hoppers 18, 74, 80 may be formed into an integral assembly, which is seated into a top 82. In the example illustrated, inlets to the hoppers 18, 74, 80 are uncovered. However, the apparatus 12 may be provided with a single, full lid (not shown) for covering the hoppers 18, 74, 80. Alternatively, an individual lid (not shown) may be implemented for each of the hoppers 18, 74, 80. Various configurations are possible.

To clean the apparatus 12, the assembly of the hoppers 18, 74, 80 may be pulled upwardly away from the rest of the apparatus 12. Next, the cover 56 may be removed and the bodies 24, 50 pulled out forwardly away from the support 26 for cleaning. Snaps or locking features may be implemented to prevent the bodies 24, 50 from being inadvertently dislodged from their seated positions with respect to the support 26.

The apparatus 12 may be particularly useful as a margarita maker, combining, for example, ice, lime and other citrus fruits, juice and tequila into a mixed, frozen beverage. The apparatus 12 may be made to be a relatively small and lightweight countertop appliance. The apparatus 12 may also be made to be portable, and may be battery powered.

In some examples, the apparatus 12 may include cooling functionality to cool the beverage during the shaving/mixing and/or afterwards when it is retained in the tray 72. Although not shown, the apparatus 12 may include additional components, including, for example, gaskets, locking features, attachment features, hinges, and/or a hopper holder to block view of internals.

While the above description provides examples of one or more apparatuses or methods, it will be appreciated that other apparatuses or methods may be within the scope of the accompanying claims.

We claim:

1. An apparatus for making mixed beverages, comprising:
    a housing;
    an electric motor in the housing;
    a first hopper in the housing for receiving a first beverage ingredient;
    a shaving mechanism supported in the housing, the shaving mechanism comprising a first body arranged to receive the first beverage ingredient from the first hopper, the first body comprising a sidewall, at least one shaving blade located on the sidewall, and at least one respective opening extending through the sidewall; and
    a mixing mechanism supported in the housing, the mixing mechanism comprising a second body for receiving the first beverage ingredient from the first body,
    wherein the first body is configured to receive torque from the electric motor to move the at least one shaving blade so that
    i) the at least one shaving blade shaves the first beverage ingredient,
    ii) the first beverage ingredient is delivered through the at least one opening in the sidewall, and
    iii) the first beverage ingredient is conveyed within the first body, and
    wherein the second body is connected to and is driven by the first body to rotate about an axis.

2. The apparatus of claim 1, wherein the second body comprises at least one mixing blade for urging the first beverage ingredient generally in a first axial direction that is parallel to the axis.

3. The apparatus of claim 1, wherein the first body is configured to receive the torque from the electric motor to rotate the at least one shaving blade about an axis.

4. The apparatus of claim 3, wherein the first beverage ingredient is delivered through the at least one opening generally in a first radial direction that is orthogonal to the axis.

5. The apparatus of claim 4, wherein the first beverage ingredient is delivered from the first hopper to the first body by force of gravity.

6. The apparatus of claim 5, wherein the first beverage ingredient is conveyed within the first body generally in a first axial direction that is parallel to the axis.

7. The apparatus of claim 6, wherein the first axial direction is generally horizontal.

8. The apparatus of claim 7, wherein a diameter dimension between the sidewall and the axis increases along the first axial direction.

9. The apparatus of claim 8, wherein the sidewall is generally frustoconical in shape.

10. The apparatus of claim 1, wherein the first body comprises a plurality of shaving blades spaced apart about the sidewall, and a plurality of respective openings extending through the sidewall.

11. An apparatus for making mixed beverages, comprising:
    a housing;
    an electric motor in the housing;
    a first hopper in the housing for receiving a first beverage ingredient;
    a shaving mechanism supported in the housing, the shaving mechanism comprising a first body arranged to receive the first beverage ingredient from the first hopper, the first body comprising a sidewall, at least one shaving blade located on the sidewall, and at least one respective opening extending through the sidewall; and
    a second hopper for receiving a second beverage ingredient, and the second beverage ingredient is delivered from the second hopper to the first body by force of gravity, wherein the first body is configured to receive torque from the electric motor to move the at least one shaving blade so that i) the at least one shaving blade shaves the first beverage ingredient, ii) the first beverage ingredient is delivered through the at least one opening in the sidewall, and iii) the first beverage ingredient is conveyed within the first body.

12. The apparatus of claim 11, wherein the at least one shaving blade of the first body shaves the second beverage ingredient supplied by the second hopper, the second beverage ingredient is delivered through the at least one opening in the sidewall, and the second beverage ingredient is conveyed within the first body.

13. The apparatus of claim 12, wherein the at least one shaving blade comprises a first blade portion for shaving the first beverage ingredient and a second blade portion for shaving the second beverage ingredient.

14. The apparatus of claim 13, wherein the first body receives torque from the electric motor to rotate the at least one shaving blade about an axis, and the first blade portion is closer to the axis than the second blade portion.

15. The apparatus of claim 14, wherein the first blade portion comprises a flat blade edge and the second blade portion comprises a serrated blade edge.

16. The apparatus of claim 1, further comprising a third hopper for receiving a third beverage ingredient, and the third beverage ingredient is delivered from the third hopper to the second body by force of gravity.

17. An apparatus, comprising:

a housing;

a first hopper in the housing for receiving a first ingredient;

a second hopper in the housing for receiving a second ingredient;

a first body rotatably supported by the housing and arranged to receive the first ingredient from the first hopper and the second ingredient from the second hopper, the first body comprising a sidewall, at least one shaving blade located along the sidewall for shaving the first and second ingredients, and at least one opening extending through the sidewall for delivering the first and second ingredients into the first body; and a second body rotatably supported by the housing, the second body connected to and driven by the first body and arranged to receive the first and second beverage ingredients from the first body, the second body comprising at least one mixing blade for mixing the first and second ingredients within the second body.

18. The apparatus of claim 1, further comprising a second hopper for receiving a second beverage ingredient, and the second beverage ingredient is delivered from the second hopper to the first body by force of gravity.

19. The apparatus of claim 18, wherein the at least one shaving blade of the first body shaves the second beverage ingredient supplied by the second hopper, the second beverage ingredient is delivered through the at least one opening in the sidewall, and the second beverage ingredient is conveyed within the first body.

20. The apparatus of claim 19, wherein the at least one shaving blade comprises a first blade portion for shaving the first beverage ingredient and a second blade portion for shaving the second beverage ingredient.

* * * * *